(12) United States Patent
Koehn et al.

(10) Patent No.: US 7,984,875 B2
(45) Date of Patent: Jul. 26, 2011

(54) MULTI-POSITION SECURE DOOR SYSTEM

(75) Inventors: Michael S. Koehn, Bellevue, WA (US); Mark G. Feuerstein, Mercer Island, WA (US); Andrew Sones, Bothell, WA (US); James Johnson, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 755 days.

(21) Appl. No.: 11/853,647

(22) Filed: Sep. 11, 2007

(65) Prior Publication Data
US 2009/0065641 A1 Mar. 12, 2009

(51) Int. Cl.
*B64D 11/00* (2006.01)
(52) U.S. Cl. ...................... 244/118.5; 244/129.5; 52/174
(58) Field of Classification Search ............... 244/118.5, 244/129.4, 129.5; 52/64, 65, 174; 109/59 R, 109/59 T, 53, 64, 73; 105/331, 332; 296/24.3
See application file for complete search history.

(56) References Cited

U.S. PATENT DOCUMENTS

| | | | | |
|---|---|---|---|---|
| 588,888 | A | * | 8/1897 | Van Kannel ...................... 49/45 |
| 1,043,055 | A | * | 10/1912 | Carter ........................... 454/251 |
| 4,741,275 | A | * | 5/1988 | Lewiner et al. ................... 109/7 |
| 6,696,979 | B2 | * | 2/2004 | Manten et al. ................ 340/945 |
| 6,702,231 | B2 | | 3/2004 | Ward |
| 6,976,658 | B2 | | 12/2005 | Sekikawa et al. |
| 2003/0066931 | A1 | | 4/2003 | Ward |
| 2003/0146347 | A1 | | 8/2003 | Roessner et al. |
| 2005/0116098 | A1 | | 6/2005 | Martens et al. |
| 2005/0230550 | A1 | | 10/2005 | Dominiguez |

\* cited by examiner

*Primary Examiner* — Tien Dinh
*Assistant Examiner* — Joseph W Sanderson
(74) *Attorney, Agent, or Firm* — Weiss & Moy, P.C.

(57) ABSTRACT

A door system for an aircraft has a flight deck door hingely coupled to a flight deck bulkhead. A lavatory is adjacent to the flight deck bulkhead and formed of a lavatory bulkhead. A lavatory door is coupled to the lavatory bulkhead. A latching mechanism is attached to the flight deck door. The latching mechanism in a first position engages the flight deck bulkhead and in a second position engages the lavatory bulkhead.

20 Claims, 6 Drawing Sheets

MULTI-POSITION SECURE DOOR SYSTEM

BACKGROUND

Embodiments of this disclosure relate generally to a door system, and more particularly, to a multi-position flight deck door that allows unfettered secure access to a lavatory by the flight deck crew.

In an aircraft, once the flight deck crew has entered the flight deck, the flight deck door is closed and locked from the inside of the flight deck. The flight deck door is a hardened flight deck door to delay forcible entry by unauthorized persons.

Once closed, there may be times when the flight deck door needs to be opened such as when a member of the flight deck crew needs to use a cabin lavatory. Currently, very few aircraft have biologic relief facilities on the flight deck so flight deck crew members must leave the security of the flight deck to use a cabin lavatory. It is also cost prohibitive to put an additional lavatory on the flight deck. Lavatory half measures on the flight deck may become a maintenance, health and working environment problem and could be uncomfortable in a social sense The airline industry was made responsible by the Transportation Security Administration (TSA) for implementing cabin security measures when routine passage through the flight deck door by cabin or flight deck crew members is necessary during flight. While each of these plans may be different, most involve cabin disruption such as moving galley carts, repositioning attendants to the flight deck or coordinated communications.

Therefore, it would be desirable to provide an apparatus and method that overcomes the above problems. The apparatus and method would allow unfettered secure access to a lavatory by the flight deck crew.

SUMMARY

A door system for an aircraft has a flight deck door hingely coupled to a flight deck bulkhead. A lavatory is adjacent to the flight deck bulkhead and formed of a lavatory bulkhead. A lavatory door is coupled to the lavatory bulkhead. A latching mechanism is attached to the flight deck door. The latching mechanism in a first position engages the flight deck bulkhead and in a second position engages the lavatory bulkhead.

A method for a flight deck crew to have secure lavatory access comprising: providing a flight deck door hingely coupled to a secured flight deck bulkhead; providing a lavatory door coupled to a secured lavatory bulkhead adjacent to the flight deck bulkhead; and providing a latching mechanism attached to the flight deck door for locking the flight deck door; wherein the flight deck door latching mechanism may lock to the flight deck bulkhead or the lavatory bulkhead.

A door system for an aircraft has a flight deck door hingely coupled to a flight deck bulkhead. A lavatory is adjacent to the flight deck bulkhead and formed of a lavatory bulkhead. A lavatory door is coupled to the lavatory bulkhead. A latching mechanism is attached to the flight deck door. The latching mechanism in a first position engages the flight deck bulkhead to lock the flight deck door in a first position to the flight deck bulkhead. Moving the latching mechanism to a second position allows the flight deck door to swing to a second position and locks the flight deck door to the lavatory bulkhead to allow flight deck personnel access to the lavatory while remaining behind the flight deck door. Moving the latching mechanism to a third position allows the flight deck door to swing to a third position and locks the flight deck door to a galley bulkhead.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
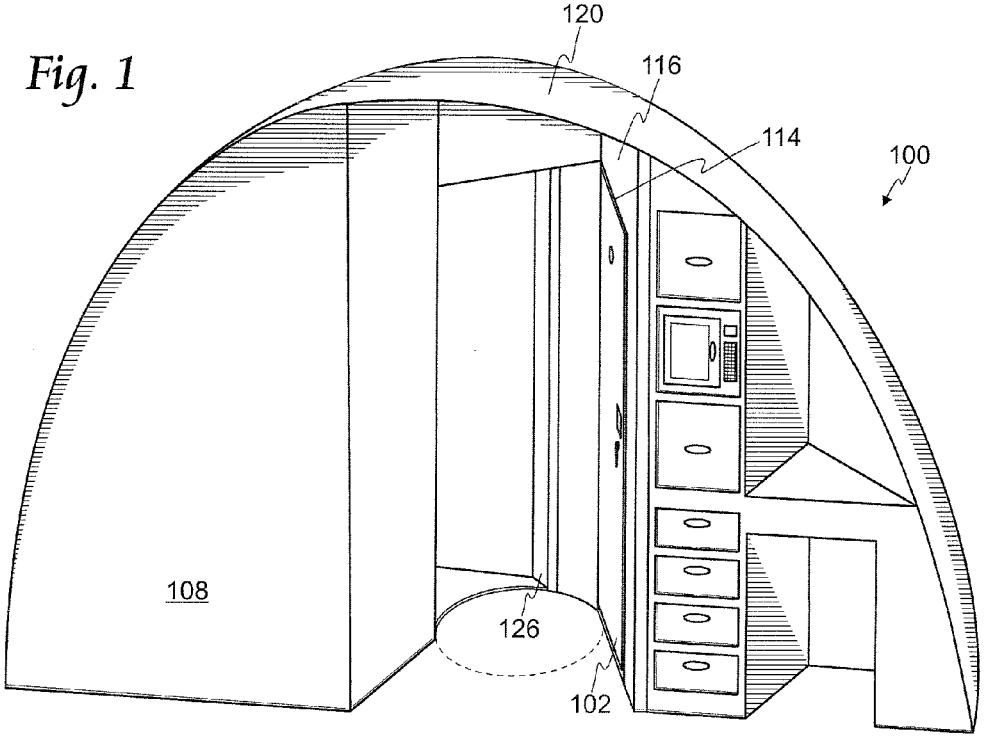
FIG. 1 is a perspective view of the door system with the flight deck door in an open position.

With reference now to the Figures, a multi-position door system 100 is shown. The system 100 allows flight deck personnel to have lavatory access within the flight deck security barrier. The door system 100 has a multi position flight deck door 102 having a latching mechanism 104. The latching mechanism 104 allows engagement with an adjacent lavatory 106 having secured bulkheads 108 to allow flight deck crew members to have secure access to the lavatory 106. A lavatory door 110 on the lavatory 106 allows the flight deck door 102 to pass and lock to the secured bulkheads 108 of the lavatory 106. A sensor and locking system 112 allow the flight deck crew to control access to the lavatory 106.

The system 100 has a flight deck door 102. The flight deck door 102 is coupled to a door frame 114 of a flight deck bulkhead 116. The flight deck bulkhead 116 extends from a floor area 118 of the cabin to a top surface 120 of the cabin. The flight deck bulkhead 116 is a hardened bulkhead to provide a secure flight deck.

Figure 2:
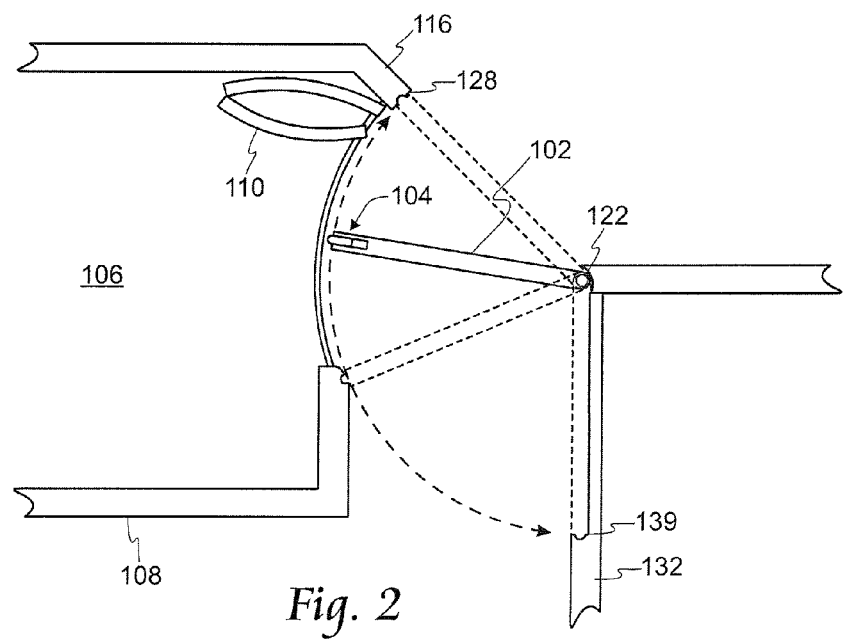
FIG. 2 is a top view of the door system.

The flight deck door 102 is a hardened door to prevent forcible entry by unauthorized persons into the flight deck. The flight deck door 102 is coupled to the door frame 114 by a hinge assembly 122. In the Figures, the hinge assembly 122 is generally a single hinge which runs from the top to the bottom of the flight deck door 102. The use of the single hinge which runs from the top to the bottom of the flight deck door 102 provides a stronger and more secure attachment. However, the single hinge assembly should not be seen as to limit the scope. In FIGS. 1 and 2, the hinge assembly 122 is positioned on the door frame 114 to allow the flight deck door 102 to be swung away from the flight deck.

Figure 3A:
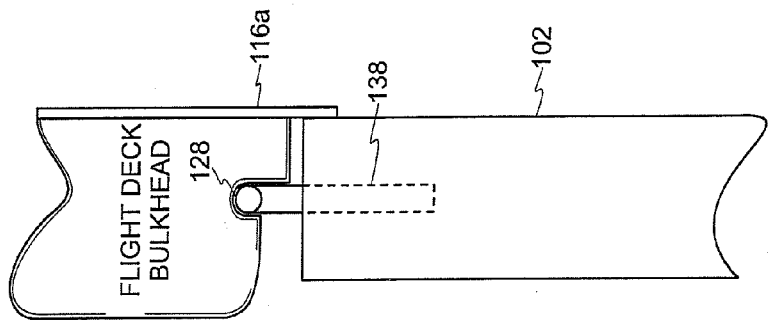
FIG. 3a-3c are magnified top views showing the locking mechanism used in the door system engaging the different bulkheads.
Figure 3B:
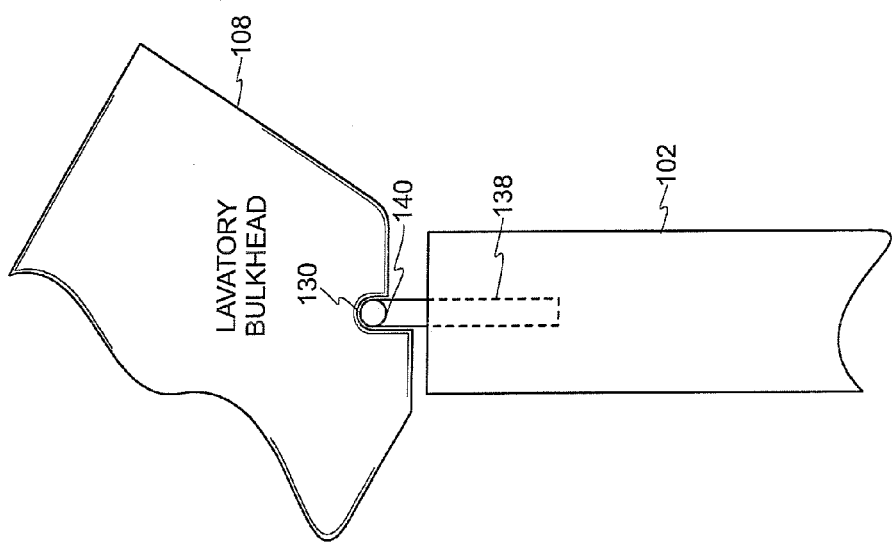
Figure 3C:
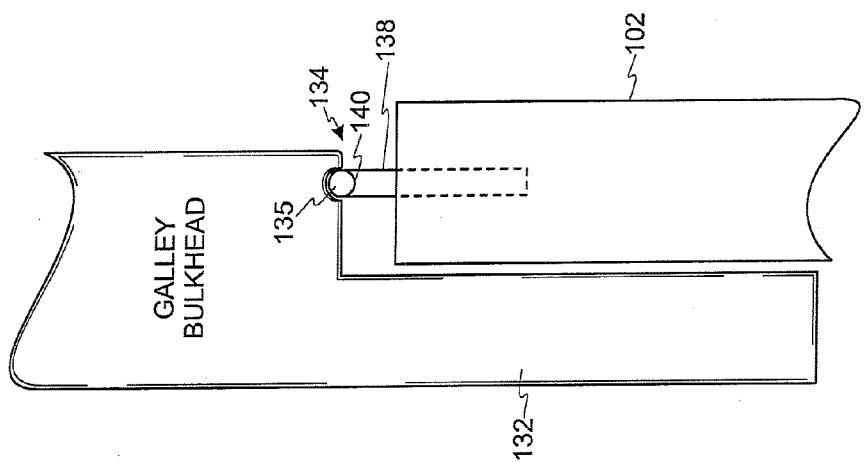
Figure 4:
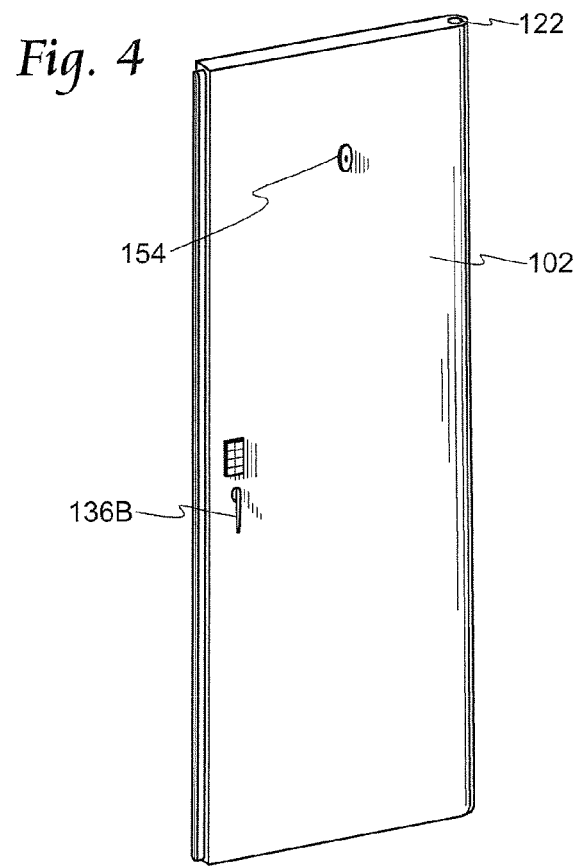
FIG. 4 is a front view of the exterior side of the flight deck door showing the locking mechanism.

As shown in FIG. 1, the flight deck door 102 is in a forward position (J1), with the flight deck door 102 secured to a door latch catch 128 (FIG. 3) formed in the door frame 114 by the latching mechanism 104. The door latch catch 128 in combination with the latching mechanism 104 prevents the flight deck door 102 from moving forward into the flight deck area. In addition, a back edge 116A (FIG. 3) of the flight deck bulkhead 116 may be extended into the door frame 114 to also prevent the flight deck door 102 from moving forward into the flight deck area. The edge 116A of the flight deck bulkhead 116 is generally extended into the side of the door frame 114 opposite to the side to which the flight deck door 102 is hinged. With the flight deck door 102 in the forward position (J1) passengers can access the lavatory 106 as it is currently done on most aircraft today.

In FIGS. 1 and 2, the lavatory 106 is shown to be adjacent to the flight deck. The lavatory 106 is formed of a secured bulkhead 108. A door opening 124 having a door frame 126 is formed in secured bulkhead 108. The lavatory door 110 is movably coupled to the door frame 126. In accordance with one embodiment, the lavatory door 110 is a contoured door. The contour of the lavatory door 110 will follow the arc path of the flight deck door 102.

A track system 128 may be formed in the door frame 126 to allow the lavatory door 110 to move from an open to a closed position. The lavatory door 110 may be a sliding accordion door, a bi-fold door, or the like. The above are given as examples and should not be seen in a limiting scope.

When the latching mechanism 104 is released from a first position, the flight deck door 102 may be moved from the forward position (J1) to the aft position (J2). During the movement of the flight deck door 102 from the forward position (J1) to the aft position (J2), an edge 102A of the flight deck door 102 will move along the lavatory door 110 of the lavatory 106. The gap between the edge 102A of the flight deck door 102 and the lavatory door 110, in addition to the curvature of the movement, prevents even small objects from being passed around the flight deck door 102. When the flight deck door 102 passes the lavatory door 110, the flight deck door 102 will hit a door latch catch 130 formed in the bulkhead 108 of the lavatory 106. The door latch catch 130 in combination with the latching mechanism 104 prevents the flight deck door 102 from moving pass the bulkhead 108 of the lavatory 106. With the flight deck door 102 moved to the aft position (J2) the lavatory 106 is now locked behind a new secure perimeter consisting of the bulkhead 108 of the lavatory 106, the flight deck door 102 and the bulkhead 132 forming the galley. With the flight deck door 102 latched in the aft position (J2), the flight deck crew can use the lavatory 106 closing the lavatory door 110 for privacy.

If access to the cabin is required by the flight deck crew or if the cabin crew needs to access the flight deck, the flight deck door 102 can be passed through the aft position (J2) towards a cabin position (J3). To move the flight deck door 102, the latching mechanism 104 is released from a second position and moved to a third position. The flight deck door 102 may then be moved from the aft position (J2) to the cabin position (J3). The flight deck door 102 will stop in the cabin position (J3) when the flight deck door 102 hits a door latch catch 135 formed in the bulkhead 132 of the galley. The door latch 130 in combination with the latching mechanism 104 locks the flight deck door 102 in the cabin position.

The latching mechanism 104 is basically comprised of a door latch 134 and a handle mechanism 136. The handle mechanism 136 generally has a handle 136A located on the interior side of the flight deck door 102. A handle 136B may also be coupled to the exterior side of the flight deck door 102 as well. The handle mechanism 136 is coupled to the door latch 134 such that rotation of the handle mechanism 136 will move the door latch 134 so that the flight deck door 102 may be moved. In general, the door latch 134 will extend from the bottom to the top of the flight deck door 102.

In accordance with one embodiment, the door latch 134 has a latch tongue 138 and a latch roller 140 coupled to an end of the latch tongue 138. When the flight deck door 102 is in the forward position (J1), the distal end of the door latch 134 will be positioned within the door latch catch 128 formed in the door frame 114 of the flight deck bulkhead 116 thereby securing the flight deck door 102 to the door frame 114.

When a flight deck crew member needs to use the lavatory 106, the crew member can manually unlock the flight deck door 102 by turning the handle 136A located on the interior side of the flight deck door 102 a desired angular range (zone 1). The handle force for unlocking at J1 is the lower of two handle forces. The handle 136A travel limit is signaled by a second higher force. When the handle 136A is turned a desired angular range (zone 1) the latch mechanism 134 will retract out of the door latch catch 128. As long as the Zone 1 travel is not exceeded after unlocking the flight deck door 102 at J1, the flight deck door 102 can only be pushed by the flight deck crew member to the outward stop at J2. At J2, the latch roller 140 will engage the door latch catch 130 formed in the bulkhead 108 of the lavatory 106. Any attempt to intrude from the cabin side while the flight deck door 102 is transitioning between J1 and J2 would push or pull the flight deck door 102 to the respective stops, either door latch catch 128 formed in the door frame 114 of a flight deck bulkhead 116 or the door latch catch 130 formed in the bulkhead 108 of the lavatory 106. Once the handle mechanism 136 is released, the latching mechanism 104 will latch the flight deck door 102 in the respective stop J1 or J2.

If access to the cabin is required by flight deck crew or if the cabin crew needs to access the flight deck, the flight deck door 102 can be passed through the aft position (J2) towards a cabin position (J3). To move the flight deck door 102, the flight crew member can manually unlock the flight deck door 102 by turning the handle 136A a desired angular range (zone 2). The handle force for unlocking at J2 is the higher of two handle forces. When the handle 136A is turned the desired angular range (zone 2) the latch mechanism 104 will retract out of the door latch catch 130. The flight deck door 102 can then be pushed by the crew member to the outward stop at J3. At J3, the movement of the flight deck door 102 will be stopped by the galley bulkhead 132. The latch roller 140 will then engage the door latch catch 135 formed in the bulkhead 132 of the galley. When the handle mechanism 136 is released, the latching mechanism 104 will latch the flight deck door 102 in the door latch catch 135. The door latch catch 135 in combination with the latching mechanism 104 locks the flight deck door 102 in the cabin position J3.

Figure 5:
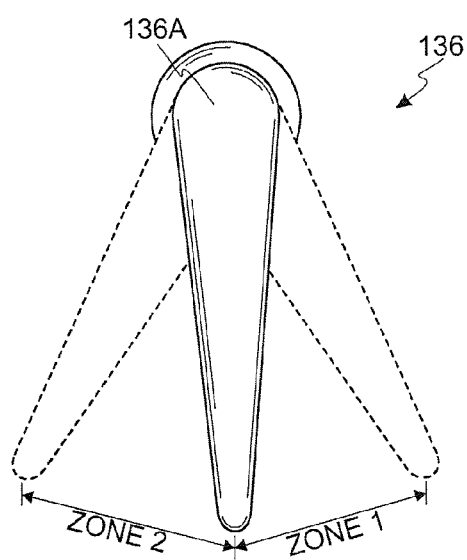
FIG. 5 is front view showing the different handle positions for an interior handle of the flight deck door.
Figure 6:
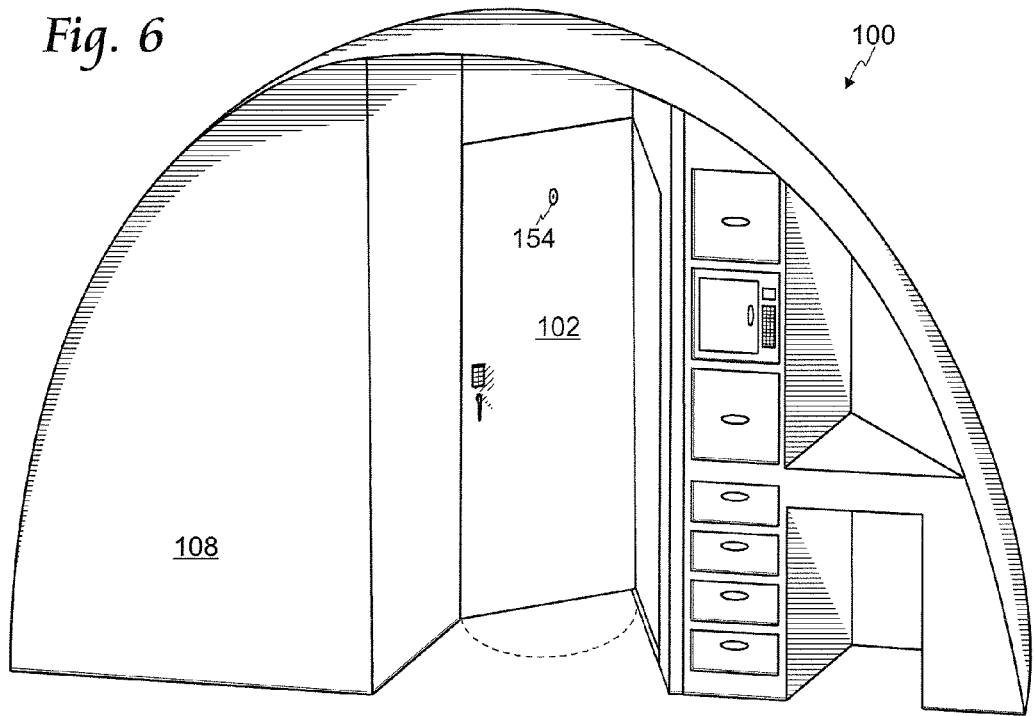
FIG. 6 a perspective view of the door system with the flight deck door in a position to allow secure access to the lavatory.
Figure 7:
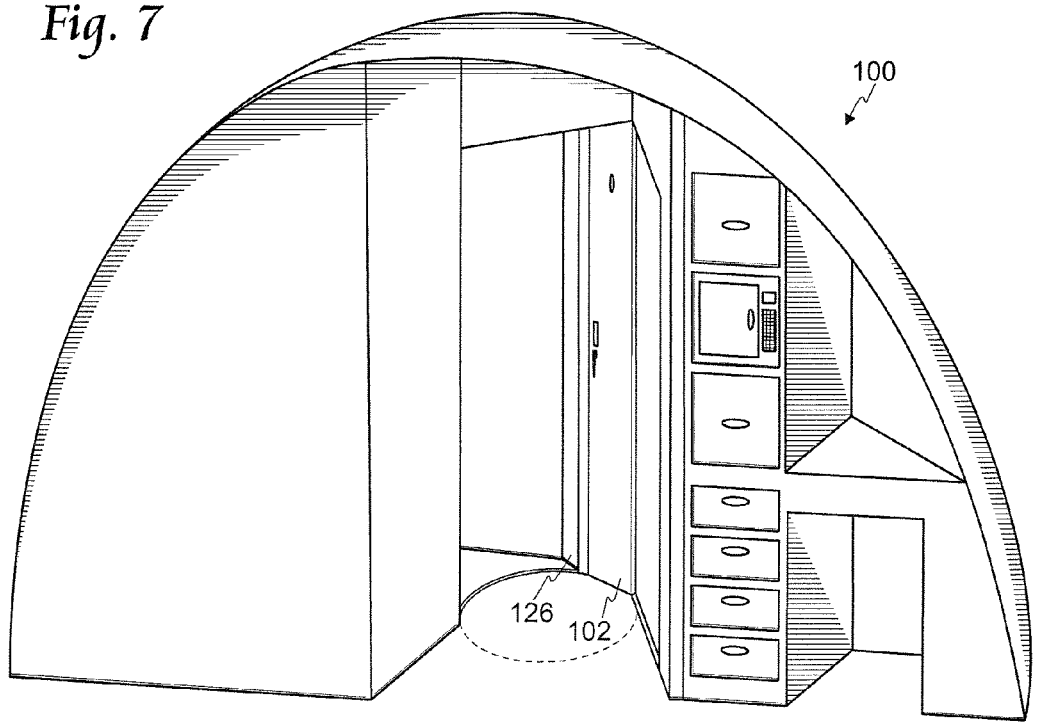
FIG. 7 a perspective view of the door system with the flight deck door in a position to allow passenger access to the lavatory.
Figure 8:
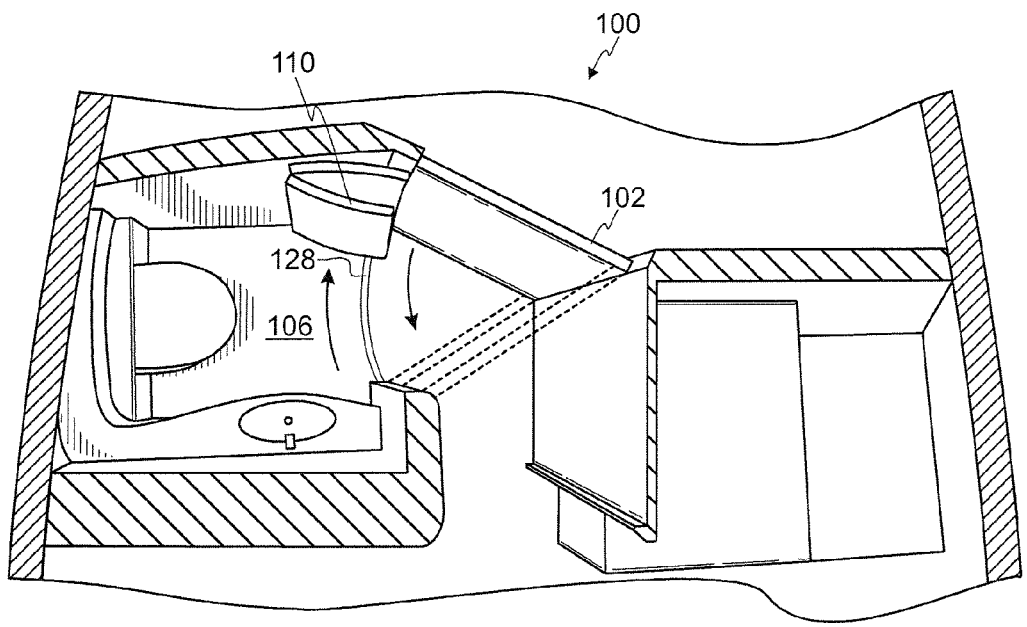
FIG. 8 is a top view of the door system showing the movement of the flight deck door with the flight deck door in a position to allow passenger access to the lavatory.
Figure 9:
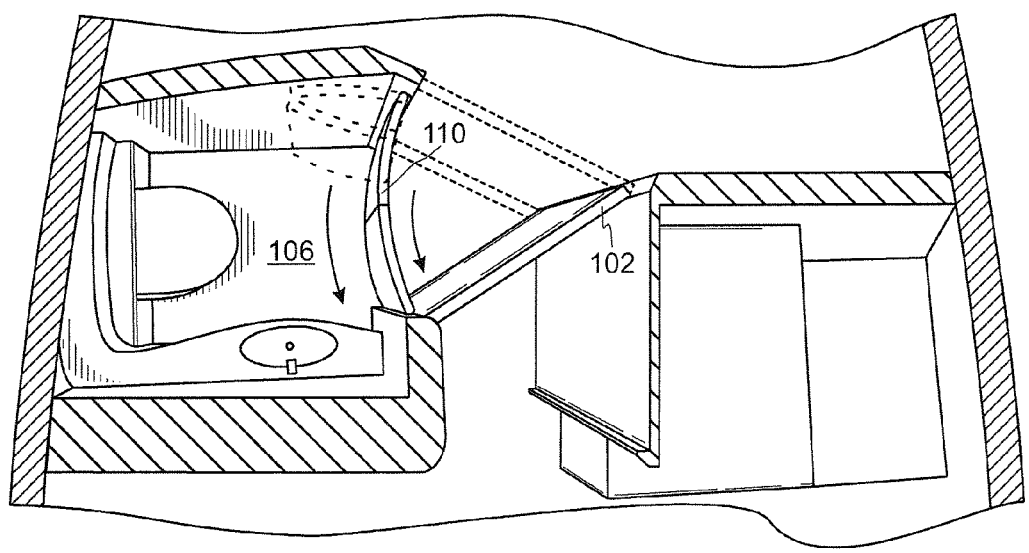
FIG. 9 is a top view of the door system showing the movement of the flight deck door with the flight deck door in a position to allow the flight deck crew secure access to the lavatory.
Figure 10:
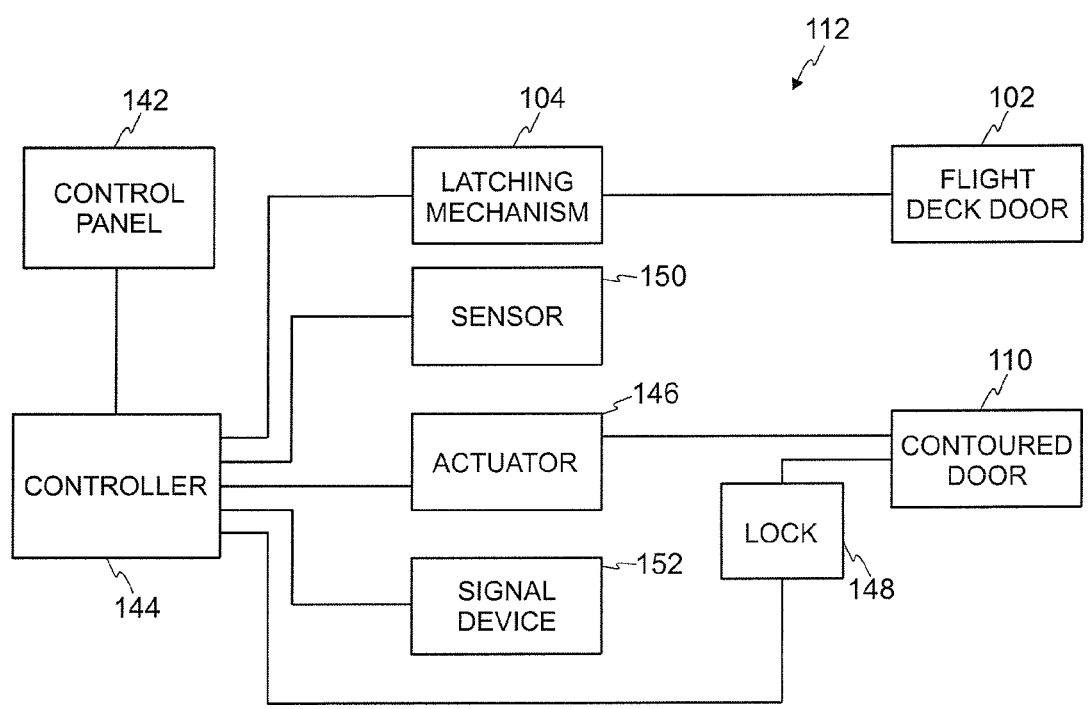
FIG. 10 is a simplified block diagram showing the control unit used with the door system.

Referring now specifically to FIG. 10, a simplified block diagram of the sensor and locking system 112 is shown. The system 112 will allow automated latching and unlatching at J1, J2 and J3. The automated latching and unlatching is controlled by the flight deck crew or cabin crew via the system 112 and is accomplished by the handle mechanism 136 located in the door. FIG. 5 shows one embodiment of the system 112. A main control panel 142 is generally located in the flight deck. The control panel 142 is coupled to a controller 144. The controller 144 is coupled to the latching mechanism 104 to automatically lock and unlock the flight deck door 102. Once unlocked, the flight deck crew or cabin crew will rotate the handle mechanism 136 to move the flight deck door 102.

The controller 144 is also coupled to an actuator 146. The actuator 146 is also coupled to the lavatory door 110. The flight deck crew using the control panel 142 can command the controller 144 to active the actuator 146 to open and/or close the lavatory door 110. The flight deck crew using the control panel 142 can further command the controller 144 to lock and unlock a locking device 148 of the lavatory door 110.

The controller 144 is further coupled to a sensor device 150. The sensor device 150 is located in the lavatory 106 and will signal the flight deck crew if the lavatory 106 is occupied. The flight deck crew may further control a signal device 152 which is located in the cabin. The signal device 152 will show if the lavatory 106 is currently occupied or unoccupied. Thus, if a flight deck crew member needs to use the lavatory 106, the crew member may activate the signal device 152 to say the lavatory 106 is occupied to prevent passengers from getting out of their seats to use the lavatory 106. In accordance with one embodiment, when a flight deck crew member needs to use the lavatory 106 but the lavatory 106 is currently occupied, once the lavatory 106 is evacuated the control unit 140 may automatically lock the lavatory door 110 and signaled the flight crew that the lavatory 106 is sterile and lock protected.

In operation, when the flight deck door 102 is in the forward position (J1), passengers can access the forward lavatory 106 as is it is currently done on aircraft today. No additional activity is required from the flight or cabin crews including the necessity of keeping the lavatory 106 access area clear of staging passengers. The flight crew can monitor the control panel 142 to know when the lavatory 106 is occupied and unoccupied. When the lavatory 106 is unoccupied, the flight deck crew member may activate the signal device 152 to say the lavatory 106 is occupied to prevent passengers from getting out of their seats to use the lavatory 106. The flight deck crew may then use the control panel 142 to active the actuator 146 to close the lavatory door 110 if the lavatory door 110 was left open. The flight deck crew can then use the control panel 142 to lock the lavatory door 110.

Once a flight deck crew member has left his/her seat to access the lavatory 106, a check is made of the hallway outside the flight deck door 102 via a peep hole 154 in the flight deck door 102 to ensure the sweep area is clear. The flight deck crew member may then manually unlock the fight deck door at J1 by turning the door handle 136A a specified angular range (zone 1). The handle force for unlocking at J1 is the lower of two handle forces. The handle travel limit is signaled by a second higher force. As long as the Zone 1 travel is not exceeded after unlocking the flight deck door 102 at J1, the flight deck door 102 can only be pushed to the outward stop at J2. Any attempt to intrude from the cabin side while the flight deck door 102 is transitioning between J1 and J2 would push or pull the door to the respective stops and latch the flight deck door 102 if the handle 136A is released.

With the flight deck door 102 latched at J2 the lavatory door 110 of the lavatory 106 is unlocked and the flight deck crew member can use lavatory 106 closing the lavatory door 110 for privacy. Cabin crew members can still access the flight deck (with video surveillance) with the flight deck door in position J1 or J2 and a single pilot at the controls. If the pilot remotely unlocks the flight deck door 102 at J1 or J2 to allow the flight deck door 102 to swing through J2 towards J3 to allow cabin attendant access, the lavatory door 110 "lock out" logic will be inhibited.

When access to the cabin is required by flight deck crew or if the cabin crew needs to access the flight deck, the flight deck door 102 can be passed through the aft position (J2) towards a cabin position (J3). To move the flight deck door 102, the flight crew member can manually unlock the flight deck door 102 by turning the interior door handle 136A a desired angular range (zone 2). The handle force for unlocking at J2 is the higher of two handle forces. When the interior door handle 136A is turned the desired angular range (zone 2), the latch mechanism 134 will retract out of the door latch catch 130. The flight deck door 102 can then be pushed by the crew member to the outward stop at J3. At J3, the movement of the flight deck door 102 will be stopped by the galley bulkhead 132. The latch roller 140 will then engage the door latch catch 135 formed in the bulkhead 132 of the galley. The door latch catch 135 in combination with the latching mechanism 104 locks the flight deck door 102 in the cabin position.

The system 100 allows the lavatory 106 to be transferred inside the security confines of the flight deck at the discretion of the flight deck crew. The lavatory door 110 of the lavatory 106 acts as an integral part of the transition between stops J1 and J2 increasing safety. Unlike a second door or security screen/nets designed to disguise when the flight deck door is open or slow down an assault the system 100 allows the flight deck door 102 to be visible at all times in all positions to forward Cabin TSA observers to prevent obscured tampering.

The system 100 further minimizes the concerns of passengers about flight deck crew incapacitation since the crew member would be within the flight deck security confine when using the lavatory 106. By retaining the crew member inside the security perimeter at all times there is no requirement to have a cabin attendant positioned on the flight deck to visually clear the flight deck door 102 prior to admitting the crew member when video surveillance is not an airplane option. Furthermore, eliminating the video surveillance for this purpose is a potential cost and weight savings. The flight deck door 102 cannot be successfully rushed when in transit as the door will only be pushed closed against the J1 stop as the result of an assault. Pulling the flight deck door 102 open while the flight deck door 102 is being moved from J1 to J2 is not possible because of the stop at J2.

While embodiments of the disclosure have been described in terms of various specific embodiments, those skilled in the art will recognize that the embodiments of the disclosure can be practiced with modifications within the spirit and scope of the claims.

What is claimed is:

1. A door system for an aircraft comprising:
   a flight deck door hingely coupled to a flight deck bulkhead;
   a lavatory adjacent to the flight deck bulkhead and formed of a lavatory bulkhead;
   a lavatory door coupled to the lavatory bulkhead; and
   a latching mechanism attached to the flight deck door, the latching mechanism in a first position engaging the flight deck bulkhead to secure the flight deck door to the flight deck bulkhead and in a second position engaging the lavatory bulkhead to secure the flight deck door to the lavatory bulkhead to allow access to the lavatory only from a flight deck.

2. A door system for an aircraft in accordance with claim 1 wherein the flight deck door is a hardened flight deck door.

3. A door system for an aircraft in accordance with claim 1 wherein the flight deck bulkhead and the lavatory bulkhead are hardened.

4. A door system for an aircraft in accordance with claim 1 wherein the latching mechanism is moved to a third position allowing the flight deck door to engage a galley bulkhead.

5. A door system for an aircraft in accordance with claim 1 further comprising a sensor and locking system coupled to the latching mechanism, the lavatory, and the lavatory door for automated locking and unlocking of the latching mechanism and the lavatory door and to signal when the lavatory is occupied and unoccupied.

6. A door system for an aircraft in accordance with claim 5 wherein the sensor and locking system closes and opens the lavatory door.

7. A door system for an aircraft in accordance with claim 6 wherein the sensor and locking system comprises:
   a control panel located in the flight deck;
   a controller coupled to the control panel and to the latching mechanism and to the lavatory door;
   a sensor located in the lavatory and coupled to the controller to signal when the lavatory is occupied; and
   a signal device located in the cabin and coupled to the controller to signal the cabin the status of the lavatory.

8. A door system for an aircraft in accordance with claim 7 wherein the sensor and locking system further comprises an actuator for opening and closing the lavatory door.

9. A door system for an aircraft in accordance with claim 1 wherein the latching mechanism comprises:
   a latch running a height of the flight deck door; and
   a handle mechanism positioned on at least an interior side of the flight deck door and coupled to the latch, rotation of the handle mechanism moving the latch.

10. A door system for an aircraft in accordance with claim 9 wherein the handle mechanism in a first position has the latch engaging the flight deck bulkhead to lock the flight deck door to the flight deck bulkhead, rotating the handle mechanism to a second position moves the latch to allow the flight deck door to move past the lavatory door to the lavatory bulkhead, releasing the handle mechanism locks the flight deck door to the lavatory bulkhead, rotating the handle mechanism to a third position moves the latching mechanism to allow the flight deck door to move to a galley bulkhead, releasing the handle mechanism locks the flight deck door to the galley bulkhead.

11. A door system for an aircraft in accordance with claim 1 further comprising a peep hole formed in the flight deck door.

12. A method for a flight deck crew to have secure lavatory access comprising:
   providing a flight deck door hingely coupled to a secured flight deck bulkhead;
   providing a lavatory door coupled to a secured lavatory bulkhead adjacent to the flight deck bulkhead; and
   providing a latching mechanism attached to the flight deck door for locking the flight deck door in a first position to the flight deck bulkhead and in a second position to the lavatory bulkhead to allow access to a lavatory only from a flight deck.

13. The method of claim 12 further comprising:
   rotating a handle of the latching mechanism from a first to a second position allowing the flight deck door to swing to a second position past the lavatory door; and
   releasing the handle to lock the flight deck door to the lavatory bulkhead.

14. The method of claim 13 further comprising:
   rotating the handle to a third position to allow the flight deck door to swing to a third position to a galley bulkhead; and
   releasing the handle to lock the flight deck door to the galley bulkhead.

15. The method of claim 12 further comprising:
   checking a lavatory indicator to determine if the lavatory is in use;
   signaling that the flight deck crew is going to use the lavatory; and
   looking through a peep hole in the flight deck door to see if an area in front of the flight deck door is clear of obstructions.

16. The method of claim 12 wherein providing a latching mechanism further comprises:
   providing a latch running a height of the flight deck door; and
   coupling the latch to the handle so rotation of the handle moves the latch.

17. A door system for an aircraft comprising:
   a flight deck door hingely coupled to a flight deck bulkhead;
   a lavatory adjacent to the flight deck bulkhead and formed of a lavatory bulkhead;
   a lavatory door coupled to the lavatory bulkhead; and
   a latching mechanism attached to the flight deck door, the latching mechanism in a first position engaging the flight deck bulkhead to lock the flight deck door in a first position to the flight deck bulkhead, the latching mechanism in a second position allowing the flight deck door to swing to a second position and locks the flight deck door to the lavatory bulkhead to allow flight deck personnel access to the lavatory while remaining behind the flight deck door, and the latching mechanism in a third position allowing the flight deck door to swing a third position and locking the flight deck door to a galley bulkhead.

18. A door system for an aircraft in accordance with claim 17 further comprising a sensor and locking system, wherein the sensor and locking system comprises:
   a control panel located in the flight deck;
   a controller coupled to the control panel and to the latching mechanism and to the lavatory door;
   a sensor located in the lavatory and coupled to the controller to signal when the lavatory is occupied; and
   a signal device located in the cabin and coupled to the controller to signal the cabin the status of the lavatory.

19. A door system for an aircraft in accordance with claim 17 wherein the latching mechanism comprises:
   a latch running a height of the flight deck door; and
   a handle mechanism positioned on at least an interior side of the flight deck door and coupled to the latch, wherein rotating the handle in a first position causes the latch to engage the flight deck bulkhead to lock the flight deck door in a first position, rotating the handle to a second position moves the latch to a second position allowing the flight deck door to swing so an edge of the flight deck door follows an arc of the lavatory door and locks the flight deck door to the lavatory bulkhead when the handle is released, rotating a handle to a third position moves the latch to a third position allowing the flight deck door to swing away from the lavatory to a galley bulkhead, releasing the handle locks the flight deck door to the galley bulkhead.

20. A door system for an aircraft in accordance with claim 17 wherein the hardened flight deck bulkhead prevents the hardened flight deck door from swinging into the flight deck.

* * * * *